Jan. 11, 1966  J. C. DOYLE ETAL  3,228,558
MEASURING DEVICE

Filed July 30, 1964  3 Sheets-Sheet 1

Joseph C. Doyle
Frank A. Burgett
Dale G. Sauers
Robert M. Bernardin
INVENTORS

BY
ATTORNEYS

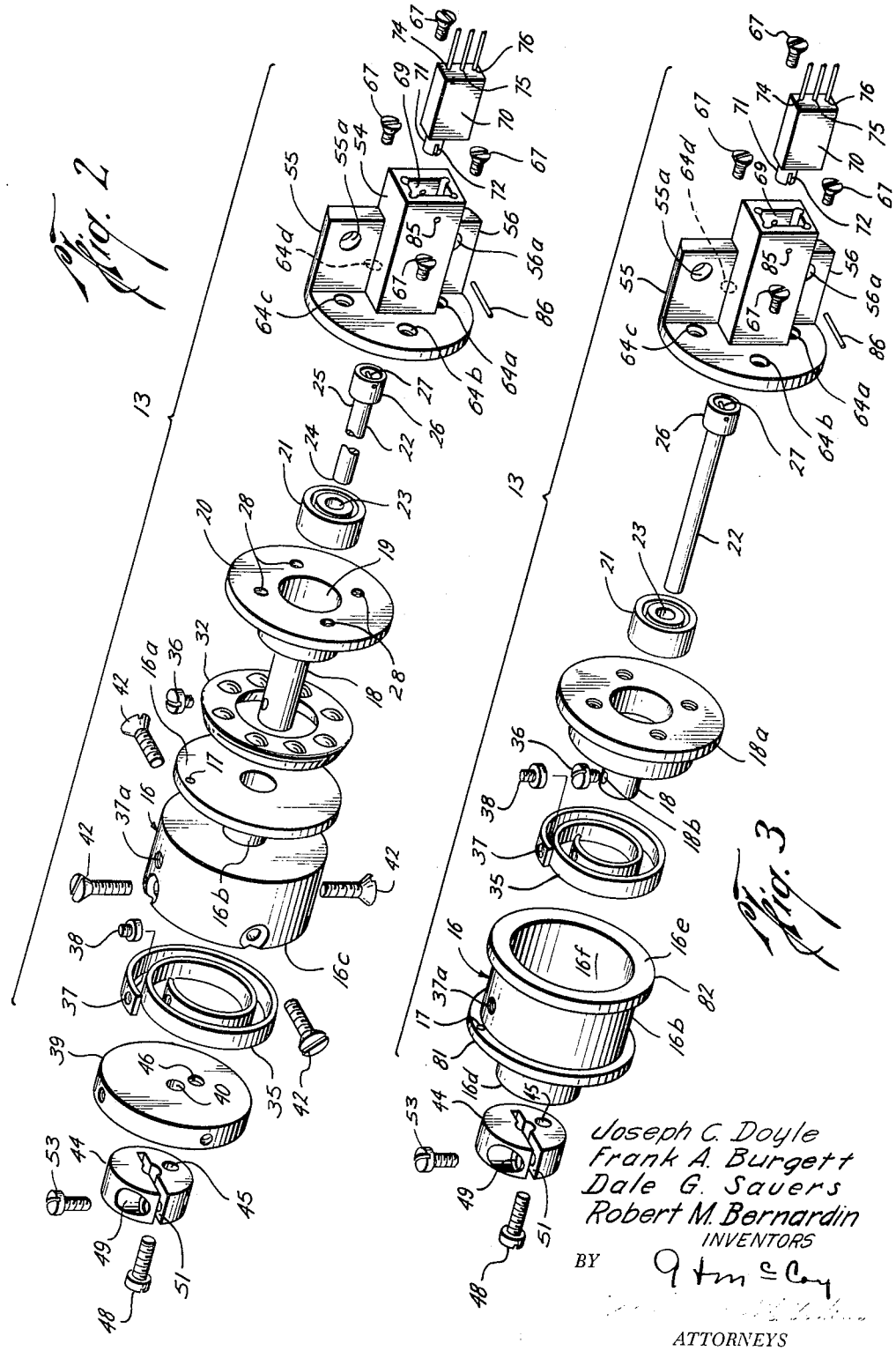

Joseph C. Doyle
Frank A. Burgett
Dale G. Sauers
Robert M. Bernardin
INVENTORS

BY
ATTORNEYS

3,228,558
MEASURING DEVICE
Joseph C. Doyle, Berkeley, Calif., Frank A. Burgett, Sugar Grove, Pa., Dale George Sauers, Clymer, N.Y., and Robert M. Bernardin, Baytown, Tex., assignors to the United States of America as represented by the Administrator of the National Aeronautics and Space Administration
Filed July 30, 1964, Ser. No. 386,467
10 Claims. (Cl. 222—45)
(Granted under Title 35, U.S. Code (1952), sec. 266)

The invention described herein may be manufactured and used by or for the Government of the United States of America for governmental purposes without the payment of any royalty thereon or therefor.

This invention relates to a fluid expulsion and measurement means and more particularly to an expulsion and measuring means in which the quantity of liquid in a tank may be immediately determined when the tank is in a zero gravity environment.

During the operation of simple mechanical systems in a zero gravity environment, various problems which obstruct effective operation are encountered. These problems are especially prevalent in mechanical systems which embody a fluid or liquid as an operative component therein. This is, of course, due to the unique behavioral characteristics which a liquid exhibits when no gravity is present. For example, a liquid under zero gravity will not flow with continuity within a pipe. It will not even flow from a higher to a lower level. It is thus apparent that "drainage," as it is commonly understood, is not present. The inability of a liquid to form a single cohesive mass and to seek a common reference surface are other characteristics exhibited under zero gravity. There occurs instead a multitude of freely floating globules which move aimlessly about the enclosure. As a consequence of these and other unique phenomena, certain functions which under normal conditions are considered rather simple, become perplexing problems. Thus a tank may not be emptied of its liquid by conventional methods. Likewise, the liquid in the tank defies measurement of its quantity by conventional means and smooth liquid flow is never present.

As evidenced by Patents 3,104,526 and 3,083,870, the prior art has recognized the problem of expelling fluid from a tank, and the bladder expulsion concept was devised as a solution therefor. However, such solution overlooks the additional problem of measuring the quantity of liquid remaining in the tank. Thus, the subject invention pertains to a device which, though simple in concept and design, not only expels the liquid from a tank under zero gravity by an improved expulsion means but will, in addition, measure the quantity of fluid which remains in the tank during the expulsion operation. The device embodies an impervious elastic bladder or diaphragm which is disposed within a tank in such a manner as to separate it into two airtight sections. The liquids, such as fuel or water for example, is stored on one side of the bladder, while the volume on the other side of the bladder is pressurized with a gas such as oxygen, for example. In order to expel the liquid from the tank, the oxygen pressure on the bladder is gradually increased, thereby expanding the bladder against the liquid and forcing the liquid through an outlet in its end of the tank. Movement of the expulsion bladder is measured by an electro-mechanical transducer comprising a spring loaded rotating spool having one end of a cord attached to it and wound thereon and having the other end connected to the rear of the bladder. The axle of the spool is connected to and turns the wiper arm of a conventional potentiometer so that the output voltage from the potentiometer is a direct function of the number of rotations of the spool which is in turn dependent on the position of the expulsion bladder. The position of the bladder is indicative of the amount of fluid remaining in the tank. As the bladder passes down the tank expelling the fluid, the unwinding cord turns the spool whose shaft thereby turns the potentiometer. The potentiometer voltage is calibrated on a meter face which indicates the quantity of fluid remaining in the enclosure.

This measuring device is applicable not only in measuring liquids in a tank under zero gravity, but as may be recognized, the cord could be attached to any slow moving object where it is desired to determine the distance moved. This may, for example, be a valve, door means, or other closure member. Thus the device is not only versatile but is also dependable as it has been found to effectively perform the measuring function under the most adverse conditions such as extreme temperature and atmospheric variations and also under abrupt changes in orientation.

Other features and advantages of the invention will become apparent from the following detailed description and accompanying drawings in which like numerals denote like elements and wherein:

FIG. 2 illustrates an exploded view of the measuring mechanism shown in FIG. 1;

FIG. 3 is an exploded view of a modified measuring mechanism;

Figure 1:
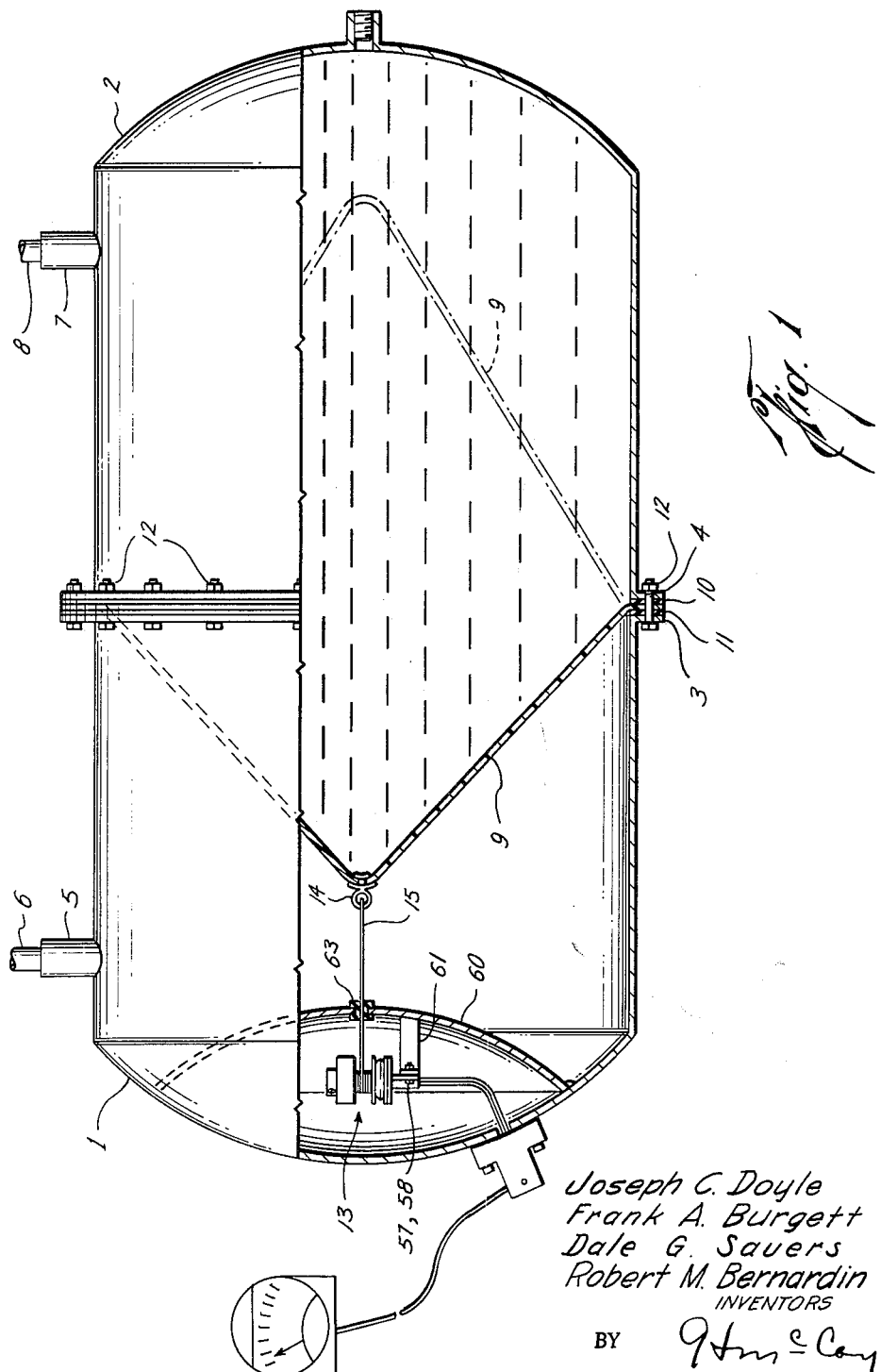
FIG. 1 is a cut-away view of a tank showing the bladder and measuring mechanism of the invention.

The exemplary device embodying the principles of this invention comprises a container or tank, an extensible diaphragm dividing the tank into two sections, and a transducer mechanism for translating diaphragm movement into a meaningful measurement. Reference is made to FIG. 1 wherein there is shown a liquid tank and transducer of the type contemplated. The tank is divided into two sections 1 and 2, each section having a flange 3 and 4, respectively, about its perimeter. At the top of section 1 is gas inlet 5 to which is connected gas supply line 6. At the top of the tank's liquid section 2 is liquid outlet 7 through which the liquid is expelled by way of tube 8. Although the inlet and outlet are shown at the top of the tank they may be located in any position which permits the most efficient transfer of the fluids.

Diaphragm 9, which is conically shaped, includes a circumferential flange 10 which is held between the abutting flanges 3 and 4 of the tank section. Gasket 11, of neoprene or other similar material, may be placed over the diaphragm flange 10 between the tank flanges before they are connected. The metal tank flanges are then connected as by bolts and nuts 12 which fit through aligned, circumferentially spaced holes in the flanges of each tank section and also in the diaphragm and gasket flanges. In this manner the diaphragm is securely anchored in position and is further connected in such a manner as to preclude leakage of either gas or liquid between the gas and liquid sections.

Since the operation of transducer 13 is completely dependent upon the location of the center of the diaphragm (where the cord is to be attached), it is important that the diaphragm, and particularly its central portion, always be free from irregular or spot-stretching. Therefore the diaphragm should be made from materials of homogenous strength and thickness. Uniformity of these characteristics is important also because of the necessity for the diaphragm to invert itself, as the pressure increases, to a direction opposite from that which it initially had.

This inversion is shown by the dotted diaphragm line 9 in FIG. 1. It is thus apparent that since maximum distortion and stress occurs as the diaphragm passes the center of the tank, the central portion of the diaphragm will not move linearly nor at deliberate speed if the diaphragm has irregular thickness or strength. In addition it must be relatively thin so as to be easily invertible. The diaphragm material must further be resistant to deterioration from the gas and also to the particular liquid which it is to be in contact with. Although the material used must in some instances vary with the liquid or fluid in the tank, it has been found, for example, that neoprene diaphragms perform well under the aforementioned requirements when the liquid in the tank is water. The size of the diaphragm will vary, of course, depending upon the diameter or size of the tank in which it is used.

On the pressurized side of the diaphragm shown in FIG. 1 is a molded hook or connection 14 to which a cord 15 is attached. Cord 15 attached to the hook must be of "no stretch" material since stretching would adversely affect the accuracy of the measurement. Therefore, a cord made of nylon, wire, Dacron, glass, or any conventional dial cord possessing a "no stretch" characteristic is acceptable. One end of the cord is attached to the diaphragm connection 14, as previously explained, and the other end of the cord extends to pulley 16 (FIG. 2) of the transducer 13 which is fixedly connected to an interior flange 61 in the tank in a manner described hereinafter. The cord is threaded through aperture 17 and a knot is tied at the end thereof to prevent it from coming out.

Figure 4:
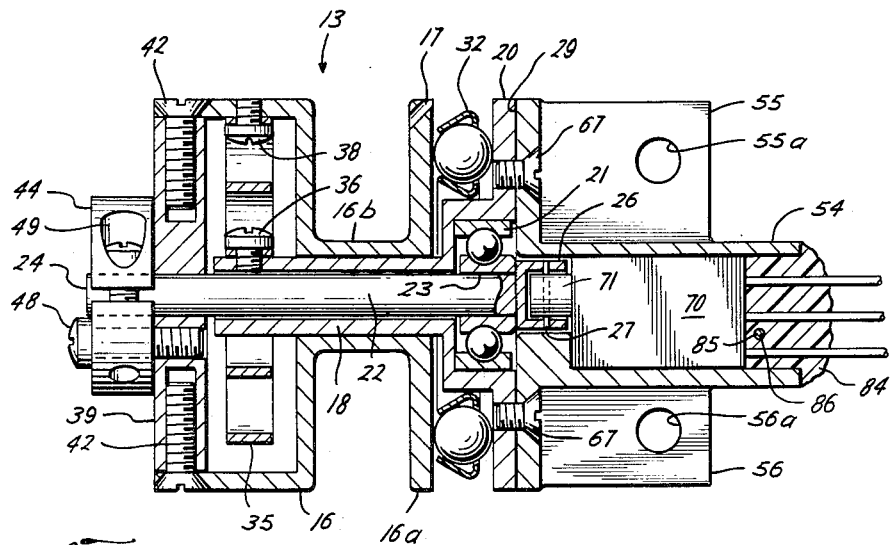
FIG. 4 is an assembled sectional view of the measuring mechanism of FIG. 2.

With reference to FIG. 2 it is seen that the transducer includes pulley 16 mounted on pulley mount 18. Integral with the pulley mount is pulley mount thrust face 20. Fixedly disposed as by press fitting in a recess 19 in pulley mount thrust face 20, is a small annular roller bearing 21. The transducer shaft 22, as shown in foreshortened form, is then press fitted into internal race 23 of the bearing until the bearing face abuts the side of face tube 25 (refer to FIG. 4). Thus the transducer shaft, being fixedly attached in the pulley mount, rotates freely in it. Pulley 16 also includes a circular thrust face 16a perpendicularly disposed with respect to transducer shaft 22. As best seen in FIG. 4, one end 24 of transducer shaft 22 extends about ⅜ inch past the end of pulley mount 18. At the other end 25 of transducer shaft 22 is a cylindrical face tube 26 fixedly attached to and rotating with shaft 22. Face tube 26, it is noted, protrudes past the thrust face on this end. Permanently fixed across the diameter, but within the face tube, is a stainless steel pin 27, the purpose of which will be described hereinafter. It is thus seen that transducer shaft 22, pulley mount 18, bearing 21, and pulley mount thrust face 20 comprise an integral unit in which the transducer shaft and its face tube rotate.

With reference to FIGS. 2 and 4, it is seen that pulley mount thrust face 20 has four bored holes 28 at 90° angles to each other which are to receive stainless steel screws 67 for attachment to potentiometer housing face 29 described hereinafter.

Pulley 16 is a single piece barrel-shaped element having the aforementioned thrust face end 16a, a hollow central shaft or spool portion 16b, and an open-ended hollow spring housing section 16c. Thrust face 20 of pulley mount 18 would normally retard movement of pulley 16 because of the friction developed upon contact of thrust face 20 with thrust face 16a of the pulley. To preclude this an annular, dual-face roller bearing 32 is disposed between the two thrust faces 20 and 16a. The bearing rides on the circular shoulder 18d of the pulley mount.

In spring housing end 16c of the pulley is disposed a coil spring 35 or other tensioning means for uniformly and constantly resisting pulley rotation and hence string payout. This necessary in order to preclude overrun of the pulley and smooth payout of the cord. Such arrangement contributes to accurate measurement of the diaphragm movement. The tension is achieved by having the inner end of the spring connected to non-moving pulley mount 18 by means of a screw 36, while the other end 37 of the tensioning spring is connected to the interior surface of the spring housing 16c of the pulley by a similar screw 28 which fits into tapped aperture 37a therein. After the spring is securely attached within the housing section, a back plate 39, having a central hole 40 therein, through which shaft 22 protrudes, is fitted into spring housing 16c. Its exterior surface fits flush with the spring housing end as shown in FIG. 4, for example. Four flat head stainless steel screws 42 are inserted into radially directed and aligned tapped apertures in both spring housing section 16c and in back plate 39 to securely hold the back plate to the spring housing. Thus, the back plate keeps the coil spring from slipping out of its end housing. Attached to that end of transducer shaft 22 which protrudes from back plate 39 and in abutting relation to the back plate is a split collar shaft retainer 44. The split collar shaft retainer has a tapped aperture 45 which, when aligned with a similar tapped aperture 46 in back plate 39, receives a fillister head screw 48 which holds the back plate retainer, back plate, and hence the pulley in fixed and abutting relation. The split collar retainer further has a recess 49 in its circumferential surface and a tapped aperture therein which is chordally directed through split 51 of the collar and out the other side. Into this tapped aperture a screw 53 is inserted and tightened in order to clamp the split collar retainer and hence pulley to the transducer shaft. This screw also precludes the pulley from slipping longitudinally off the shaft. Hence it is seen that rotation of pulley 16 causes shaft 22 to rotate within mount 18.

Reference is now made to the aforementioned potentiometer housing 54. Integral with the housing are a pair of flanges 55 and 56 which have apertures 55a and 56a. As previously noted, the interior of the tank has a wall 60 (FIG. 1) disposed therein to which an L-shaped mounting flange 61 is attached. Potentiometer flanges 55 and 56 are connected to wall 60 by screws 57 and 58 which are inserted through apertures 55a and 56a. In the center of wall 60 is an aperture and annular plastic washer 63 through which the cord travels as the diaphragm moves down the tank.

Circular face 29 of the potentiometer housing has four apertures 64a–d radially disposed at 90° angles to each other which receive screws 67 for mounting the aforementioned thrust face 20 of the pulley mount thereto, as shown in FIG. 4.

Within the potentiometer housing is a machined compartment 69 which receives potentiometer 70 of conventional design. The potentiometer used in the subject device requires eight rotations of its shaft in order to traverse its voltage range, however, more or less rotations could be used, depending upon the size of the tank and the measurement accuracy desired. At the end of the potentiometer's rotating shaft is phenolic head 71 with slot 72 therein. As shown in FIG. 4, for example, head 71 protrudes into a stepped recess in the housing. The phenolic head is used instead of a conventional ceramic head due to the ability of the former to absorb operational shock without cracking and also to electrically isolate the potentiometer wiper arm from ground. The potentiometer is calibrated such that eight rotations of head 71 will move the wiper arm through a three volt range, for example.

As previously described, face tube 26 has a stainless steel pin 27 fixed therein across its diameter. Phenolic head 71 of the potentiometer fits into face tube 26 in such a manner that stainless steel pin 27 therein engages slot 72 in the phenolic head when annular face 29 of the potentiometer housing is screwed to its mating surface, i.e. thrust face 20 of the pulley mount. The potentiometer is then anchored in the machined housing by an epoxy in order to transfer any stress from the electrical connection at 74, 75, 76 to the epoxy and housing.

It is thus seen that the transducer-potentiometer becomes an integral unit in which potentiometer housing 54 is fixed to the tank and in which pulley mount thrust face 20 is fixed to housing 54. Thus pulley 16 rotates about mount 18 turning shaft 22 as it rotates due to the connection resulting from screws 48 and 53. Therefore, as gas is injected into the pressure side of the tank, the diaphragm moves, expelling the liquid from the tank and also pulling the spring biased-taut cord behind it. As the cord unwinds it turns the pulley which turns the transducer shaft by reason of its aforementioned positive attachment thereto through the split collar retainer. The transducer shaft in turn is keyed in the potentiometer through the stainless steel pin and phenolic head. Thus, lineal movement of the center of the diaphragm varies the voltage from the potentiometer. For example, when the tank is partially full, the potentiometer will have advanced a proportionate distance, as shown in FIG. 1. The voltage at this point will then be calibrated on a voltmeter face which shows the volume in the tank. In order to accomplish this calibration, the diameter of pulley spool 16b is calculated such that it is required to rotate the same number of times which the potentiometer rotates in moving through its voltage range. Thus, for example, if an 8-turn potentiometer were used in a liquid tank where diaphragm travel was 22 inches, a spool having a diameter sufficient to accommodate 22 inches of string in 8 turns would be required. Such a spool should have a circumference (C) equal to 22 inches divided by 8 (turns) or 2.75 inches. Since $C=\pi d$, the required diameter for the spool would then be .876 inch. The entire transducer mechanism for such a tank as hereinbefore described would be less than 1.75 inches long.

Figure 5:
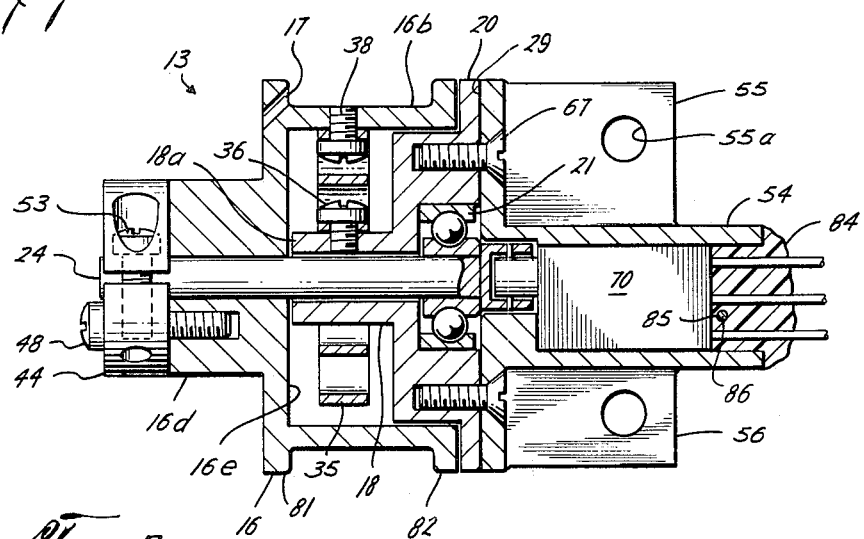
FIG. 5 is an assembled sectional view of the measuring mechanism of FIG. 3.

In FIGS. 3 and 5 is shown a modified type of transducer design which is used in tanks larger than those using the transducer of FIGS. 2 and 4. In relatively small tanks, as for example a nine pound liquid capacity tank, the transducer pulley spool portion must have a small diameter because the potentiometer must make at least five or six turns to obtain reasonably accurate readings on a calibrated meter face. Although readings are obtainable with a lower number of turns they are not sufficiently accurate for lineal measurement purposes. However, on larger tanks the pulley, and hence potentiometer, will normally rotate a sufficient number of times to obtain accurate readings without having to reduce the spool size. This, of course, is due to the greater length of the tank. When the pulley is of a larger diameter it becomes possible to dispose the coil spring within the pulley itself, as shown in FIG. 5, rather than placing the coil spring in a separate housing portion at the end of the pulley spool, as exemplified by FIG. 4. Further, by placing the coil spring within hollow 16f of the pulley spool (FIG. 3), it is possible to eliminate thrust face roller bearing 32 (of FIG. 2) since the over-all length of the transducer is short and the binding between faces 20 and 16a (of FIG. 2) is minimized as a result of lower moment-type forces about the contact point of the thrust faces. Since the bearing is eliminated it is necessary that there be no abutting surfaces between the moving and stationary portions of the transducer. Thus, it is noted in FIG. 5 that a small space exists between interior pulley wall 16e and wall 18a of the pulley mount, for example. In the device of FIG. 5 split collar retainer 44 receives connecting screw 48 which fixedly attaches the retainer to crown portion 16d of pulley 16. The retainer is then fixedly connected to transducer shaft 24 by a tightening screw 53 in the same manner as the device of FIG. 4. As best seen in FIG. 3, the exterior of the spring housing has a pair of circumferential flanges 81 and 82 on each side which constitute the string boundary surfaces when it is wound on spool 16b. Coil spring 35 is connected interiorly of pulley spring housing 16. The inner end has an aperture which receives screw 36 for insertion into tapped hole 18b of the pulley mount. The other end of the spring has an aperture 37 which receives screw 38 for insertion into tapped hole 37a. The cord which connects the diaphragm and pulley is, as previously explained, threaded through aperture 17 wherein a knot is tied on the split retainer side of raised portion 81 so that the string will not slide out. It is then wound on spool portion 16b. The operation of the diaphragm and modified transducer is identical to the diaphragm and transducer initially described.

Although the mechanism described herein has been explained with reference to liquid measurement in a non-gravity system, it is recognized that the potentiometer-transducer arrangement may be used in conjunction with other devices embodying slow moving surfaces without departing from the essence of this invention. Examples of such may include slow moving valves, doors, or other closures in which a quantity measurement is desired.

What is claimed and desired to be secured by Letters Patent is:

1. An enclosure having a movable, impervious wall therein separating it into mutually excluded first and second sections; entry means in said first section for injecting a fluid therein to thereby cause movement of said wall in the direction of said second section; exit means in said second section so that fluid may be expelled therefrom due to movement of said wall, the improvement consisting of:

means for measuring the quantity of fluid in said enclosure, said means for measuring comprising a transducer and potentiometer, said transducer including a pulley mount means mounted to said first section and a rotatable transducer shaft supported in said pulley mount means, a pulley rotatably mounted on said pulley mount means, means connecting said pulley to said movable wall, means fixedly holding the pulley to the rotatable transducer shaft, and means for transmitting shaft movement to said potentiometer so that movement of the wall causes the transducer shaft to rotate, thereby varying the voltage from the potentiometer.

2. The enclosure as recited in claim 1 wherein an annular roller bearing is fixedly secured within said pulley mount means with said shaft engaging the annular portion of said bearing and extending therethrough;

said pulley mount means comprising a thrust face transversely disposed with respect to the axis of said shaft for supporting said transducer.

3. The enclosure as recited in claim 2, wherein said pulley comprises a circular thrust face, a hollow end housing and a tubular shaft connecting said thrust face to said end housing;

an annular, dual faced thrust bearing;

said thrust bearing disposed over a shoulder of said pulley mount with one face abutting said pulley mount thrust face and the other face abutting the circular thrust face of said pulley, thereby reducing the rotational friction of said pulley.

4. The enclosure as recited in claim 3, wherein said transducer includes a pulley restraining means for preventing pulley overrun when said wall begins to move.

5. The enclosure as recited in claim 4, wherein said restraining means is disposed within said hollow end housing of said pulley and comprises a coil spring, one end of said spring being fixedly attached to the pulley mount and the other end of said spring fixedly attached to the interior of said hollow end housing;

an annular back plate disposed over said transducer shaft and in flush abutting engagement with said end housing for retaining said coil spring within said housing; and means affixing said back plate to said spring housing.

6. The enclosure as recited in claim 1 wherein the means holding the pulley to the rotatable shaft comprises a split collar having a recess in its circumferential surface with a chordally directed tapped hole in said recess.

said split collar having another hole disposed therethrough for receiving pulley connection means;

screw means in said another hole affixing said collar to said pulley;

the end of said transducer shaft disposed in the split of said collar; and a tightening screw in the tapped hole affixing said split collar to said transducer shaft, thereby causing said shaft and pulley to rotate together with respect to said pulley mount and also precluding longitudinal displacement of said pulley with respect to said shaft.

7. The enclosure as recited in claim 5, wherein said means for fixedly holding the pulley to said transducer shaft comprises a split collar having a recess in its circumferential surface and a chordally directed tapped hole in said recess;

a centrally disposed hole in the split of the collar with said shaft disposed in said centrally disposed hole; and a tightening screw in the tapped hole affixing said split collar to said transducer shaft, said split collar fixedly connected to said back plate to thereby cause said shaft to rotate with said pulley and also precluding longitudinal movement of said shaft with respect to said pulley.

8. The enclosure as recited in claim 1, wherein said means for transmitting shaft movement to said potentiometer comprises a potentiometer shaft having a slotted head at the end thereof;

a hollow cylindrical face tube attached to the end of said transducer shaft; and a pin affixed to the interior of said face tube, said pin engaging the slot in the head of said potentiometer shaft so as to thereby provide an integral rotating shaft.

9. An enclosure having a movable, impervious wall therein, separating it into mutually excluded first and second sections;

entry means in said first section for injecting a pressurized fluid therein to thereby cause said wall to move in the direction of said second section;

exit means in said second section for allowing a fluid therein to be expelled as said wall moves;

a rotating transducer means affixed to said enclosure;

means connecting said wall to said transducer means; and a potentiometer operatively connected to said rotating transducer means so that movement of said wall is transmitted to said rotating transducer, and thus producing a changing potential by said potentiometer.

10. An enclosure having a movable impervious wall therein separating it into mutually excluded first and second sections;

entry means in said first section for injecting a fluid therein to thereby cause said wall to move in the direction of said second section;

exit means in said second section for allowing another fluid to be expelled as a result of movement of said wall; and means operatively connected to said movable wall, for measuring the quantity of fluid in said enclosure;

said means comprising a transducer and potentiometer;

said transducer including a pulley mount means connected to said enclosure and having an annular roller bearing therein;

a rotatable transducer shaft within said bearing and protruding therefrom;

said transducer shaft operatively connected to the rotating shaft of said potentiometer;

a pulley supported on and rotatable about said pulley mount means;

said pulley having a crown portion with an aperture therein through which said transducer shaft protrudes; and connection means affixed to said crown and to said transducer shaft for rotating said pulley and shaft together with respect to said pulley mount.

References Cited by the Examiner

UNITED STATES PATENTS

| | | | |
|---|---|---|---|
| 2,571,476 | 10/1951 | Offutt | 222—386.5 X |
| 3,063,411 | 11/1963 | Phillips et al. | 222—386.5 X |

References Cited by the Applicant

UNITED STATES PATENTS

| | | |
|---|---|---|
| 1,625,703 | 4/1927 | Bobo. |
| 2,146,049 | 2/1939 | Barry. |
| 2,498,064 | 2/1950 | Borell. |
| 2,681,586 | 6/1954 | Pressler. |
| 2,769,883 | 11/1956 | Eckert et al. |
| 3,083,870 | 4/1963 | Gillespie. |
| 3,104,526 | 9/1963 | Hirshfeld et al. |

LOUIS J. DEMBO, *Primary Examiner.*

CHARLES R. CARTER, *Examiner.*